United States Patent [19]

Laurent et al.

[11] 4,027,261
[45] May 31, 1977

[54] SYNCHRONIZATION EXTRACTOR

[75] Inventors: Pierre Laurent; Ljubimko Milošević, both of Paris, France

[73] Assignee: Thomson-CSF, Paris, France

[22] Filed: Aug. 25, 1975

[21] Appl. No.: 607,510

[30] Foreign Application Priority Data

Aug. 27, 1974 France .............................. 74.29294

[52] U.S. Cl. ................................. 328/63; 307/208; 307/269; 178/69.1
[51] Int. Cl.² ........................................ H03K 1/17
[58] Field of Search ............. 307/208, 269; 328/63, 328/72; 178/69.5 R

[56] References Cited

UNITED STATES PATENTS

| 3,588,709 | 6/1971 | Hoyler | 328/63 |
| 3,619,662 | 11/1971 | Vachon | 307/269 |
| 3,893,033 | 7/1975 | Finch | 328/63 |
| 3,916,324 | 10/1975 | Shuda | 328/63 |

Primary Examiner—Stanley D. Miller, Jr.
Attorney, Agent, or Firm—Karl F. Ross; Herbert Dubno

[57] ABSTRACT

The herein disclosed synchronization extractor is designed to recover a train of useful pulses of given recurrence period T from an input signal containing both useful pulses and parasitic pulses. Each period T is divided into $n$ sampling intervals of a duration less than or equal to that of the pulses. The pulses present in the several intervals are respectively counted by $n$ reversible counters. Backward-counting pulses, having a recurrence period which is greater than the period T but less than the recurrence periods of the parasitic pulses, are applied to the counters simultaneously. The useful pulses are collected from that counter in which the mean rate of the forward-counting pulses exceeds that of the backward-counting pulses.

8 Claims, 4 Drawing Figures

//4,027,261//

SYNCHRONIZATION EXTRACTOR

FIELD OF THE INVENTION

Our present invention relates to a synchronization extractor.

BACKGROUND OF THE INVENTION

Devices of this kind are used primarily in information-transmission systems in which the information to be transmitted is coded in digital form and/or sampled, and is used to modulate a carrier by frequency shift or phase reversal for example. At the transmitter, the timed distribution of the successive symbols representing the information is effected on the basis of sync pulses furnished by a clock. At the receiver, in order to carry out proper demodulation, it is necessary for the demodulator to be synchronized with the modulator in the transmitter so as to establish when one symbol or bit ceases and the next begins. Synchronizing means are therefore provided in the system.

The synchronizing signal, in the absence of distortions occurring during transmission, will consist of a series of pulses of constant duration and a constant and accurately defined recurrence period. However, distortions during transmission mean that certain pulses disappear while others are time-shifted and mixed with parasitic pulses.

OBJECT OF THE INVENTION

The object of our invention is to facilitate the recovery of solely the useful pulses, in correctly timed positions and with the accuracy on the order of the duration of the pulses themselves.

SUMMARY OF THE INVENTION

A synchronization extractor according to our invention, designed to recover a train of useful pulses of predetermined recurrence period T from an input signal containing parasitic pulses besides the useful pulses, comprises a sampling circuit controlled by a source of clock pulses of frequency $n/T$ for deriving $n$ samples of recurrence period $T/n$ from the incoming signal and distributing the $n$ samples of each period T among $n$ reversible counters to which backward-counting pulses with a recurrence period longer than T are also applied. A load circuit common to all the counters is energized by incoming pulses received exclusively during a recurrent sampling interval of length $T/n$ allocated to that counter which is stepped faster by the signal samples reaching its forward stepping input than by backward-counting pulses applied to its reverse-stepping input.

BRIEF DESCRIPTION OF THE DRAWING

Other features of the invention will become apparent from the ensuing description given with reference to the accompanying drawing in which.

SPECIFIC DESCRIPTION

Let us consider a signal constituted by pulses of constant duration $\tau$ and likewise constant recurrence period T. This signal may be a sync signal traveling from a transmitter to a receiver. During transmission, the signal experiences distortions. Certain pulses in the original signal may disappear altogether, others may be time-shifted and, finally, certain parasitic pulses may be interleaved between useful pulses. The received signal cannot then be utilized as a sync signal.

In order to isolate the useful pulses, we take advantage of the fact that the parasitic pulses due to distortions are not timed precisely with the period T. Only the useful pulses can be reproduced with this period on a number of occasions statistically higher than for the parasitic pulses.

Each period T is thus chopped into $n$ intervals of duration less than or equal to that of the pulses, i.e. $T/n \leq \tau$. If a useful pulse occurs in one of these intervals, all the useful pulses will occur within the same interval in each period T. By contrast, parasitic pulses will occur in any other interval and be distributed in a random and non-periodic manner.

To detect the useful pulses and reject the parasitic pulses, the device in accordance with the invention comprises, therefore, means for counting the pulses occurring in successive recurrences of each interval. The useful pulses fill the corresponding counter much faster than the parasitic pulses; in fact, with the circuit arrangement described hereinafter, none of the other counters ever reaches its full count. It is thus merely necessary to obtain from the output of this counter a discriminating signal in order to determine the interval of each period T within which each useful pulse occurs and to give passage to these pulses for synchronizing a clock having an operating frequency corresponding to the pulse cadence $1/T$.

Figure 1:
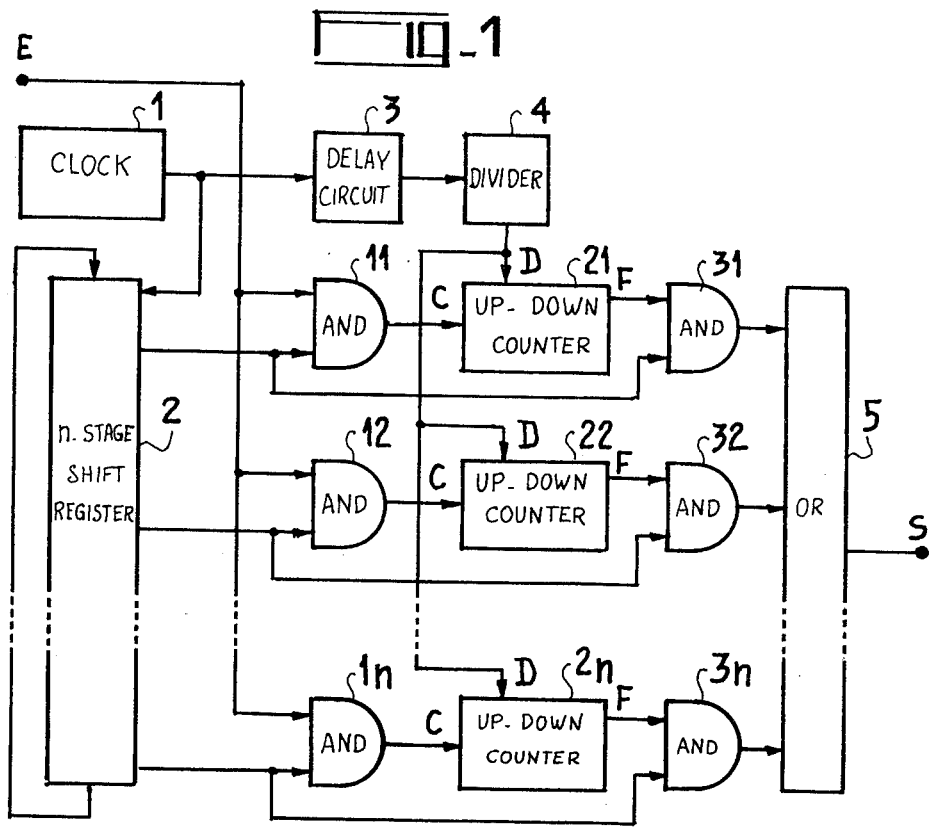
FIG. 1 is a block diagram of a device in accordance with the invention.

The sync-pulse extractor shown in FIG. 1 comprises a clock 1 furnishing pulses having a recurrence period $T/n$ and thus a frequency $n/T$. These pulses are applied to an $n$-stage shift register 2 whose output is coupled by a feedback path to its own input so that a 1 bit circulates periodically in the register with the same recurrence period T as that of the useful pulses whose time of arrival it is desired to determine to within an error of $T/n$. Each of the outputs of the $n$ stages of the register, cyclically energized by the circulating bit, is connected to a first input of one of $n$ AND-gates designated 11, 12 ... 1$n$, respectively, which can in turn transmit a signal from their second input to their output during a respective interval of length $T/n$ within each period T. The sync signal received, with its useful and parasitic pulses, is applied to a terminal E connected to all the second inputs of the AND-gates 11, 12 ... 1$n$. These AND-gates constitute, together with register 2, a timing circuit chopping each period T of the received signal into $n$ sampling intervals. Each gate therefore furnishes a 1 if a pulse is present in the corresponding sampling interval, and a zero if the contrary is the case. The AND-gates are respectively connected to forward-stepping input C of $n$ reversible or up/down counters 21, 22 ... 2$n$. In order to ensure that only a counter receiving signal samples at an average rate above a certain reference value will reach its full count, backward-counting pulses are periodically applied to reverse-stepping inputs D of these counters. These backward-counting pulses are derived from the pulses of clock 1 with the help of a delay circuit 3 and a divider 4. Circuit 3 is designed to delay the backward-counting pulses in relation to the forward-counting pulses, i.e. the signal samples fed to inputs C, by a fraction of a sampling period T/n as will be apparent from graphs 2b and 2c of FIG. 2 more fully described below, thereby ensuring proper operation of the counters. The frequency divider 4 has a step-down ratio (here of 2:1) so chosen that the backward-counting pulses are produced with a recurrence period which is on average shorter than that of the parasitic pulses but substantially longer than the period T. Thus, only the counter receiving the useful pulses will be permanently full and will generate a corresponding discriminating signal in its output whereas the n-1 other counters will all be more or less empty. These counters are furthermore of a special kind. When their content is zero, the count does not change on arrival of a backward-counting pulse. When their content is a maximum, that count remains unchanged on arrival of a forward-counting pulse. Examples of circuitry suitable for these counters will be described below.

The outputs F of the counters are connected respectively to n other AND-gates 31, 32 . . . 3n. Each of these latter AND-gates is also connected, by another input, to the corresponding output of the shift register 2. The two coincidence gates (e.g. 11 and 31) connected up-circuit and down-circuit of each counter are thus energized in parallel and synchronously so that a signal sample can appear at the output of only one down-circuit gate at a time. All the outputs of the gates 31 to 3n are combined at the inputs of an OR-gate 5 whose output S forms part of a load circuit and exclusively furnishes the useful pulses which are used for example to synchronize the aforementioned clock (not shown) of frequency 1/T.

Figure 2:
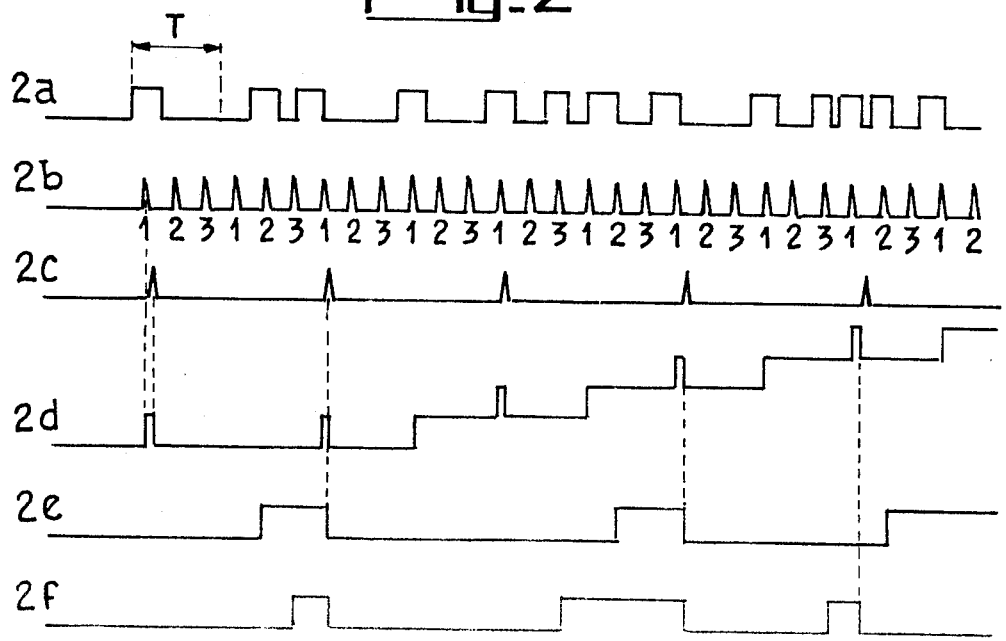
FIGS. 2a to 2f are a set of graphs showing the signals appearing at various points in the circuits of FIG. 1.

Graph 2a of FIG. 2 illustrates the input signal applied to the terminal E. It comprises useful pulses, repeated with the recurrence period T, which are sometimes absent and at times are mixed with parasitic pulses.

Graph 2b illustrates the pulses generated by the clock 1 of FIG. 1 and applied successively to the shift register 2. For the sake of simplicity, n has been made equal to 3. These pulses are distributed among three counters inserted between respective up-circuit and down-circuit AND-gates. The numbers 1, 2 and 3 inscribed beneath the pulses of graph 2b indicate that all No. 1 samples are intended for the first counter, all No. 2 samples are fed to the second counter and all No. 3 samples go to the third counter.

Graph 2c illustrates the backward-counting pulses applied to all the counters in parallel. The pulses of both graphs 2b and 2c are short spikes which, as noted above, are relatively offset by a fraction of their cycle length T/n.

Finally, graphs 2d, 2e and 2f illustrate the contents of the first, second and third counters, respectively, the assumption being made that their contents were zero prior to the first pulse shown in graph 2a. It will be observed that the first counter fills up progressively whereas the other two counters remain virtually empty.

Figure 3:
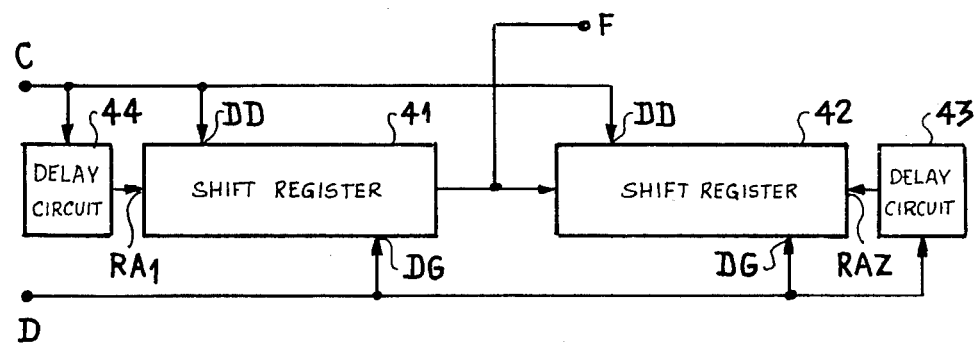
FIG. 3 is a more detailed diagram of a counter to be used in the device of FIG. 1.

FIG. 3 illustrates a first example of a counting circuit adapted to be used for units 21, 22 etc. in FIG. 1. This circuit comprises two cascaded shift registers 41 and 42, each with eight stages, able to count a total of 16 pulses. These two registers comprise inputs for forward counting and shift toward the right (terminals DD), as well as inputs for backward counting and shift toward the left (terminals DG).

The pulses furnished by the up-circuit AND-gate associated with the counter (terminal C) are applied to the two inputs DD of the registers 41, 42 and to a delay circuit 44 whose output is connected to a set-to-1 input (RA1) of the first stage of the shift register 41. The first stage of the shift register 41 is therefore set to state 1 with each signal sample which thereby increases by one the number of stages set to state 1.

The backward-counting pulses (terminal D) are applied to the two inputs DG of the registers and to a delay circuit 43 whose output is connected to a reset-to-zero input (RAZ) of the last stage in the register 42. Thus, each backward-counting pulse diminishes by one the number of stages placed in state 1.

The output of the counter (terminal F) emitting the discriminating signal is arranged between the two registers 41 and 42. The choice of this position corresponds to a threshold. In other words, as long as the register 41 is not full, there is no output signal. But as soon as the number of pulses counted exceeds eight, the output F is in state 1. This gives rise, at the output S of the extractor, to a series of pulses of duration T/n and recurrence period T, synchronized with the transmitted sync signal.

Figure 4:
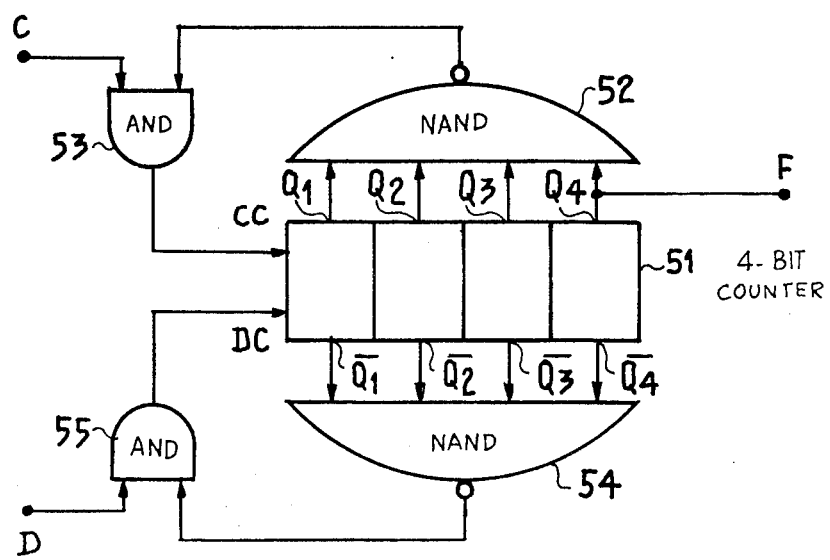
FIG. 4 is a diagram of an alternate counter usable in this device.

FIG. 4 illustrates another example of a counting circuit that can be used in our improved sync-pulse extractor. The circuit of FIG. 4 comprises a 4-bit counter 51 made up of four bistable trigger stages and capable of counting 16 pulses. The counter has a forward-stepping input CC, a backward-stepping input DC and eight outputs, i.e. four non-inverting outputs Q1, Q2, Q3 and Q4 of the trigger stages and four inverting outputs $\overline{Q1}$, $\overline{Q2}$, $\overline{Q3}$ and $\overline{Q4}$. The outputs Q1, Q2, Q3, Q4 are connected to the inputs of NAND-gate 52. The output of this gate is connected to an input of an AND-gate 53 whose other input is supplied with the forward-counting pulses (terminal C) and whose output is connected to the forward-stepping input of the counter 51. The outputs $\overline{Q1}$, $\overline{Q2}$, $\overline{Q3}$ and $\overline{Q4}$ are connected to the inputs of a NAND-gate 54. Another AND-gate 55 is connected by its inputs to the terminal D, which receives the backward-counting pulses, and to the output of the gate 54, its output being connected to the backward-stepping input of the counter 51.

The output F of the counter is branched off the output Q4 which is in the set state (1) as soon as eight pulses have been counted. The two coincidence gates 52 and 53 are designed to block the backward-counting pulses when the counter is full, i.e. when all its stages are set. Similarly, the gates 54 and 55 block the backward-counting pulses when the counter is empty, i.e. when all its stages are reset.

We claim:
1. A synchronization extractor comprising:
   a terminal for receiving an input signal containing useful pulses with a predetermined recurrence period T and accompanying parasitic pulses;
   a source of clock pulses having a frequency $n/T$, $n$ being an integer greater than 1;
   a set of $n$ reversible pulse counters each provided with a forward-stepping input and a reverse-stepping input, each of said pulse counters further having an output stage emitting a discriminating signal upon attainment of a predetermined pulse count;
   timing means controlled by said source for establishing consecutive periods T each divided into $n$ sam- pling intervals respectively allocated to said pulse counters, said timing means being connected to said terminal for delivering signal samples occurring during said sampling intervals to the forward-stepping inputs of the respective pulse counters whereby each pulse counter is advanced by a pulse present in the allocated sampling interval;

frequency-dividing means connected to said source for delivering backward-counting pulses to the reverse-stepping inputs of all pulse counters at a frequency lower than 1/T; and a load circuit connected to all said pulse counters for exclusive energization, in response to said discriminating signal, by pulses occurring in a sampling interval allocated to a pulse counter attaining said predetermined pulse count.

2. A synchronization extractor as defined in claim 1, further comprising delay means inserted between said source and said frequency-dividing means for retarding said backward-counting pulses with reference to said clock pulses by a fraction of a clock-pulse cycle.

3. A synchronization extractor as defined in claim 1 wherein each pulse counter comprises shift-register means having a first stage provided with a setting input and a last stage provided with a resetting input, a first delay circuit inserted between said forward-stepping input and said setting input, and a second delay circuit inserted between said reverse-stepping input and said resetting input.

4. A synchronization extractor as defined in claim 3 wherein said shift-register means comprises two cascaded multistage registers respectively provided with said first and said last stage, said discriminating signal being available at a connection between said cascaded registers.

5. A synchronization extractor as defined in claim 1 wherein each pulse counter comprises a group of bistable trigger stages each having a noninverting output and an inverting output, a first coincidence gate with input connections to the noninverting outputs of all said trigger stages, first gating means inserted between said timing means and said forward-stepping input and controlled by said first coincidence gate for blocking the passage of signal samples to said group in a set stage of all said trigger stages, and second gating means inserted between said frequency-dividing means and said reverse-stepping input and controlled by said second coincidence gate for blocking the passage of backward-counting pulses to said group in a reset state of all said trigger stages.

6. A synchronization extractor as defined in claim 1 wherein said timing means comprises a shift register driven by said clock pulses, said shift register being provided with feedback means for periodically circulating a stored bit and with $n$ stage outputs cyclically energized by the circulating bit during respective sampling intervals, and $n$ coincidence gates each having one input connected to said terminal and another input connected to a respective stage output of said shift register, said coincidence gates having outputs connected to the forward-stepping inputs of respective pulse counters.

7. A synchronization extractor as defined in claim 6, further comprising other coincidence gates each having one input connected to the output stage of a respective pulse counter and another input connected to a respective stage output of said shift register, said other coincidence gates having outputs connected to said load circuit.

8. A synchronization extractor as defined in claim 7, further comprising an OR gate inserted between said load circuit and the outputs of said other coincidence gates.

* * * * *